United States Patent

[11] 3,617,107

| [72] | Inventor | Ta-Shing Chu<br>Lincroft, N.J. |
|---|---|---|
| [21] | Appl. No. | 845,428 |
| [22] | Filed | July 28, 1969 |
| [45] | Patented | Nov. 2, 1971 |
| [73] | Assignee | Bell Telephone Laboratories Incorporated<br>Murray Hill, N.J. |

[54] THREE-MIRROR SCHMIDT TELESCOPE
4 Claims, 3 Drawing Figs.

| [52] | U.S. Cl. | 350/55 |
|---|---|---|
| [51] | Int. Cl. | G02b 17/60 |
| [50] | Field of Search | 350/55, 27, 200, 50 |

[56] References Cited
UNITED STATES PATENTS 1,525,658  2/1925  Roach ........................... 350/55 UX
2,504,384  4/1950  Bouwers ....................... 350/27

OTHER REFERENCES

Epstein, L. C., Sky and Telescope, " An All-Reflection Schmidt Telescope for Space Research," Vol. 33, No. 4, 1967
Ingalls, A. " Telescoptics," 161 Scientific American p. 118– 123, Aug. 1939.

*Primary Examiner*—David Schonberg
*Assistant Examiner*—T. H. Kusmer
*Attorneys*—R. J. Guenther and Arthur J. Torsiglieri ABSTRACT: A Schmidt telescope is made using a pair of reflecting correction plates to correct for spherical aberrations and achieve wide angle, high-resolution performance without the use of refracting lenses. The all-mirror telescope is particularly advantageous for use in microwave and infrared receiving apparatus because of the expense of refractive lenses for use at these frequencies.

PATENTED NOV 2 1971

3,617,107

INVENTOR
T. CHU

BY
*[signature]*
ATTORNEY

THREE-MIRROR SCHMIDT TELESCOPE

BACKGROUND OF THE INVENTION

This invention relates to a Schmidt telescope particularly useful for detecting infrared and microwave radiation.

The invention of the Schmidt telescope in 1930 provided a simple and highly useful instrument for eliminating spherical aberrations from reflecting telescopes using spherical concave mirrors. In a conventional spherical mirror telescope, the farther a light beam is from the center of the mirror, the shorter is its focal distance. Consequently the image produced by extended objects is subject to distortion, termed spherical aberration. In the original Schmidt telescope this spherical aberration is eliminated by the simple expedient of providing a thin refractive lens at the center of curvature of the mirror to introduce equal and opposite aberrations. The result is an optical system giving good definition over extremely wide fields and at relative apertures providing photographic speeds never before envisaged. For example, while an $f/1$ paraboloid has a well-defined field measured only in minutes of arc, an $f/1$ Schmidt camera can cover approximately 20°, recording as much detail of extended objects in a few minutes as a first class portrait camera lens would show in several hours. (See J. B. Sidgwick, *Amateur Astronomers Handbook*, p. 173 et seq., 1955.)

While a relatively large number of different types of Schmidt telescopes have been developed (see Albert G. Ingalls, "Telescoptics," 161 *Scientific American*, p. 118 et seq., 1939), it is difficult to utilize such telescopes for detecting infrared and microwave radiation because of the difficulty and expense of producing refractive lenses suitable for such radiation. This problem is particularly troublesome because the wide field of a Schmidt telescope makes it potentially useful as a receiver in a stationary satellite receiving microwave signals from a number of separate earth-based stations. One possible solution is the use of a reflecting corrective plate; and, indeed, one embodiment of a Schmidt telescope using a reflector to correct for spherical aberrations is known in the art. (See Ingalls, supra, p. 119, FIG. 3, VI.) The problem with this telescope, as will be discussed in greater detail hereinbelow, is that it produces the necessary correction for only a single image point. Points displaced from this particular point are increasingly blurred with increasing displacement. Consequently the field of the telescope is severely limited.

SUMMARY OF THE INVENTION

In accordance with the present invention it has been discovered that by the use of two properly positioned reflecting correction plates wide-field, high resolution performance can be achieved in an all-mirror Schmidt telescope. In particular, the reflecting correction plates are placed so that one plate intersects the radius to the center of the telescope mirror at a 45° angle, and the other is symmetrically located with respect to a plane making a 45° angle with the first correction plate at an appropriate distance from the central radius. The surfaces of the two correction plates are adjusted so that together they correct for the spherical aberration of the concave mirror.

BRIEF DESCRIPTION OF THE DRAWINGS

The advantages and features of the present invention will appear more fully upon consideration of the illustrative embodiment to be described in detail in connection with the accompanying drawings in which.

DETAILED DESCRIPTION

Figure 1:
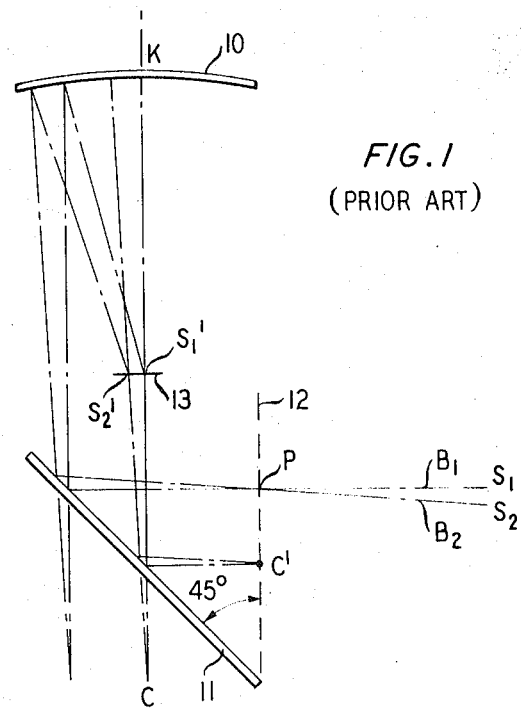
FIG. 1 is a schematic cross section of a typical prior art all-mirror Schmidt telescope.

FIG. 1 illustrates a typical prior art all-mirror Schmidt telescope comprising a spherical mirror 10 (the center of curvature of the sphere being at $c$) and a single reflecting correction plate 11 disposed at a 45° angle with respect to the central radius of spherical mirror 10.

For purposes of explanation, the line segment CK from the center, C, of the sphere to the center, K, of the spherical mirror is referred to as the central radius; and C′, the point at which a light source reflected by mirror 11 would appear to be coming from the center of the sphere, is referred to as the reflected center of curvature. In addition, an imaginary plane 12 is shown passing through the reflected center of curvature C′ and making a 45° angle with the plane of correction plate 11. This plane is referred to as the reference plane.

In operation, light beams from different sources impinge upon reflecting correction plate 11, are reflected onto spherical mirror 10 and focused onto focal surface 13.

As previously mentioned, this structure produces the necessary correction for only a single image point and, consequently, has a severely limited field. This fact may be seen by analyzing the paths of two light beams, denoted $B_1$ and $B_2$, from two separate sources, $S_1$ and $S_2$, respectively. Assuming $S_1$ and $S_2$ are far from the telescope, light from them will reach the telescope as a pair of plane waves moving in slightly different directions. $B_1$ and $B_2$ represent the portions of the two wavefronts reaching a common point P on the reference plane. As is well known in the art, beams striking this reference plane at the same point require the same amount of correction to avoid spherical aberration. However, because they come from separate sources, the two beams are separated by an angle, A, and consequently strike the correction plate at different points, as may be seen in FIG. 1. Thus a correction plate suitable for a first source is not suitable for a second source separated from the first.

Figure 2:
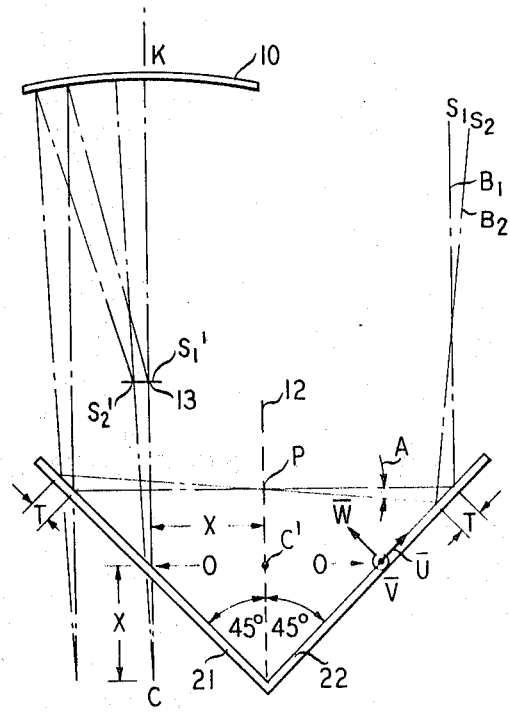
FIG. 2 is a schematic cross section of a telescope embodying features of the present invention.

To overcome this problem, a Schmidt telescope in accordance with the present invention includes a second reflecting correction plate disposed symmetrically about the reference plane with respect to the first correction plate. FIG. 2 is a schematic cross section of such a telescope. In the figure, the telescope comprises a spherical mirror 10 and two reflecting correction plates 21 and 22, each disposed at a 45° angle with respect to the central radius of spherical mirror 10 and at a 90° angle with respect to the other. In addition, the mirrors are so disposed that the reference plane 12 passing through the reflected center of curvature, C′, bisects the 90° angle between the two plates. Thus, if X is the distance from the center of curvature, C, of spherically concave mirror 20 to the point where the central radius intersects the first correction plate, the second reflecting correction plate is disposed symmetrically with respect to the first about an imaginary reference plane located at a distance X from the central radius and making a 45° angle with respect to the first plate.

Figure 3:
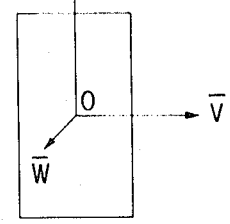
FIG. 3 illustrates the coordinate system used to describe certain features of the invention.

Advantageously the two correction plates are nearly planar, each being provided with substantially identical deviations from planarity to correct for aberration at the focal surface of spherical mirror 10. FIG. 3 illustrates a coordinate system located at the center, O, of the surface of each correcting plate useful in describing the required deviations. It can be shown that for telescopes having relatively large $f/D$ ratios, i.e., 1.5 or greater, the deviation $d$, measured in the $w$ direction is approximately given by the relation:

$$d = \frac{-\sqrt{2}\left[\left(\frac{U^2}{2}+V^2\right)^2 - k\left(\frac{U^2}{2}+V^2\right)\right]}{16R^3}$$

where $k$ is an arbitrary constant and $R$ is the radius of curvature of the spherical mirror. For smaller $f/D$ ratios, detailed ray tracing by a computer—a technique well known in the art—is required to provide the optimum design for the correction plates. For telescopes having these lower $f/D$ ratios, the two correction plates may be slightly different.

In operation, a pair of corresponding light beams, $B_1$ and $B_2$ from separate sources, $S_1$ and $S_2$, strike correction plate 22 at two different points separated by a distance, T. They are then reflected so that they intersect at the reference plane 12 and strike correction plate 21 at two points separated by a distance T, but in reversed position. Since T is small and the rate of change of deviation on the correcting plates is nearly constant in a small interval, to the first order of approximation each of the beams receives the same total amount of correction from the two plates. The beams are then reflected onto concave mirror 10 with the appropriate change in wavepath to compensate for the spherical aberration of the mirror and are then focused onto surface 13 at points $S_1'$ and $S_2'$.

It is clear that this same general structure could also be used to selectively transmit signals to selected distant receivers. In this application, sources are disposed on focal surface 13 and will be transmitted to distant receivers at corresponding positions in exactly the reverse of the aforementioned process. Thus transmitters at $S_1'$ and $S_2'$ on the focal surface will generate signals receivable at $S_1$ and $S_2$.

What is claimed is:

1. A telescope comprising:
   a spherical concave mirror; and
   means for correcting aberrations of said mirror comprising:
   a first approximately planar reflecting surface intersecting the central radius of said spherical mirror at a 45° angle and at a distance, X, from the center of curvature of said spherical mirror, the point of intersection being between the center of curvature and the focal point on said radius; and
   a second approximately planar reflecting surface symmetrical with respect to said first reflecting surface about an imaginary reference plane said reference plane being located at a distance X from said radius and making a 45° angle with the first reflecting surface.

2. A telescope according to claim 1 wherein said first and second reflecting surfaces are substantially identical and are adapted to correct for spherical aberrations of said spherical concave mirror.

3. A transmitting arrangement comprising a telescope in accordance with claim 1 including means for generating a signal of electromagnetic wave energy at selected points on the focal surface of said telescope.

4. The telescope of claim 1 wherein each of the first and second reflecting surfaces are provided with substantially identical deviations from planarity to correct for aberrations at the focal surface of the spherical mirror where the deviation $d$ measured in a direction normal to the reflecting surface is approximately given by the relation $$d = \frac{-\sqrt{2}\left[\left(\frac{U^2}{2}+V^2\right)^2 - k\left(\frac{U^2}{2}+V^2\right)\right]}{16R^3}$$

where $U$ and $V$ are distances on the reflecting surface from the center of the reflecting surface, $k$ is an arbitrary constant and $R$ is the radius of curvature of the spherical mirror.

* * * * *